United States Patent [19]
Kim

[11] Patent Number: 6,038,201
[45] Date of Patent: Mar. 14, 2000

[54] METHOD AND APPARATUS FOR RETRIEVING INFORMATION RECORDED ON REWRITABLE MAGNETO-OPTICAL MEDIA

[75] Inventor: Dae Young Kim, Seoul, Rep. of Korea

[73] Assignee: LG Electronics Inc., Seoul, Rep. of Korea

[21] Appl. No.: 09/005,230

[22] Filed: Jan. 9, 1998

[30] Foreign Application Priority Data

Nov. 10, 1997 [KR] Rep. of Korea ................... 97-59000

[51] Int. Cl.[7] ............................................. G11B 5/09
[52] U.S. Cl. ........................................ 369/48; 369/59
[58] Field of Search ............................... 369/13, 47, 48, 369/49, 54, 59, 124; 360/26, 27, 32

[56] References Cited

U.S. PATENT DOCUMENTS

| | | | |
|---|---|---|---|
| 5,253,243 | 10/1993 | Suzuki | 369/48 |
| 5,596,559 | 1/1997 | Hiramatsu | 369/49 X |
| 5,598,389 | 1/1997 | Nakano et al. | 369/48 |

FOREIGN PATENT DOCUMENTS

| | | |
|---|---|---|
| 63-173252 | 7/1988 | Japan . |
| 1292603 | 11/1989 | Japan . |
| 4325948 | 11/1992 | Japan . |

*Primary Examiner*—Paul W. Huber

[57] ABSTRACT

Method and apparatus for retrieving the information recorded on the rewritable magneto_optical media is disclosed. According to the present invention, while a regeneration beam in synchronization with a clock signal is irradiated on a mark recorded on a rewritable magneto_optical media, a regeneration signal detector detects a regenerated electrical signal from the recorded mark. On the other hand, a phase difference detector detects the phase difference between the clock signal and the regenerated electrical signal. The clock signal is delayed as much as the said phase difference and then its delayed clock signal is used as a sampling signal. The regenerated electrical signal is sampled and held in response to said sampling signal and then the regenerated electrical signal which is sampled and held by said sample-and-holder is converted into a regenerated bit signal.

14 Claims, 11 Drawing Sheets

FIG.9A  regenerated clock
FIG.9B  laser beam pulse
FIG.9C  recorded mark
FIG.9D  regenerated electrical signal
FIG.9E  delay signal (phase difference)
FIG.9F  sampling signal
FIG.9G  sample-and-held signal

METHOD AND APPARATUS FOR RETRIEVING INFORMATION RECORDED ON REWRITABLE MAGNETO-OPTICAL MEDIA

BACKGROUND OF THE INVENTION

1. Field of Invention

The present invention relates to method and apparatus for retrieving the information recorded on a rewritable magneto_optical media, more particularly, to the method and apparatus for retrieving the information recorded on the rewritable magneto_optical media having a function in which the clock signal to be used as a sampling signal is compensated in response to the phase difference between the clock signal and the regenerated electrical signal from the optical disk.

2. Discussion of the Related Art

A rewritable magneto_optical media has been in practical use as an information recording media having a high density rewritable capability. In particular, the rewritable magneto_ optical media having a recording layer made of the amorphous alloy of rare-earth and transition metals have a remarkable characteristic.

The principle of the rewritable magneto_optical media is briefly explained by taking an example. By focusing a laser beam on the surface of a rewritable magneto_optical media as a spot whose diameter is as short as the wavelength of the light, the temperature of the spot on the recording layer is raised up to 150° C.–200° C. If the temperature of the recording media heated by the laser beam goes up to Curie temperature (Tc), the magnetization of the spot is disappeared. At this time, if constant magnetic bias field is applied in one direction, magnetic mark (it is called a pit) is recorded on the recording layer by the magnetic inversion occurring when the heated area returns to the room temperature.

Figure 1:
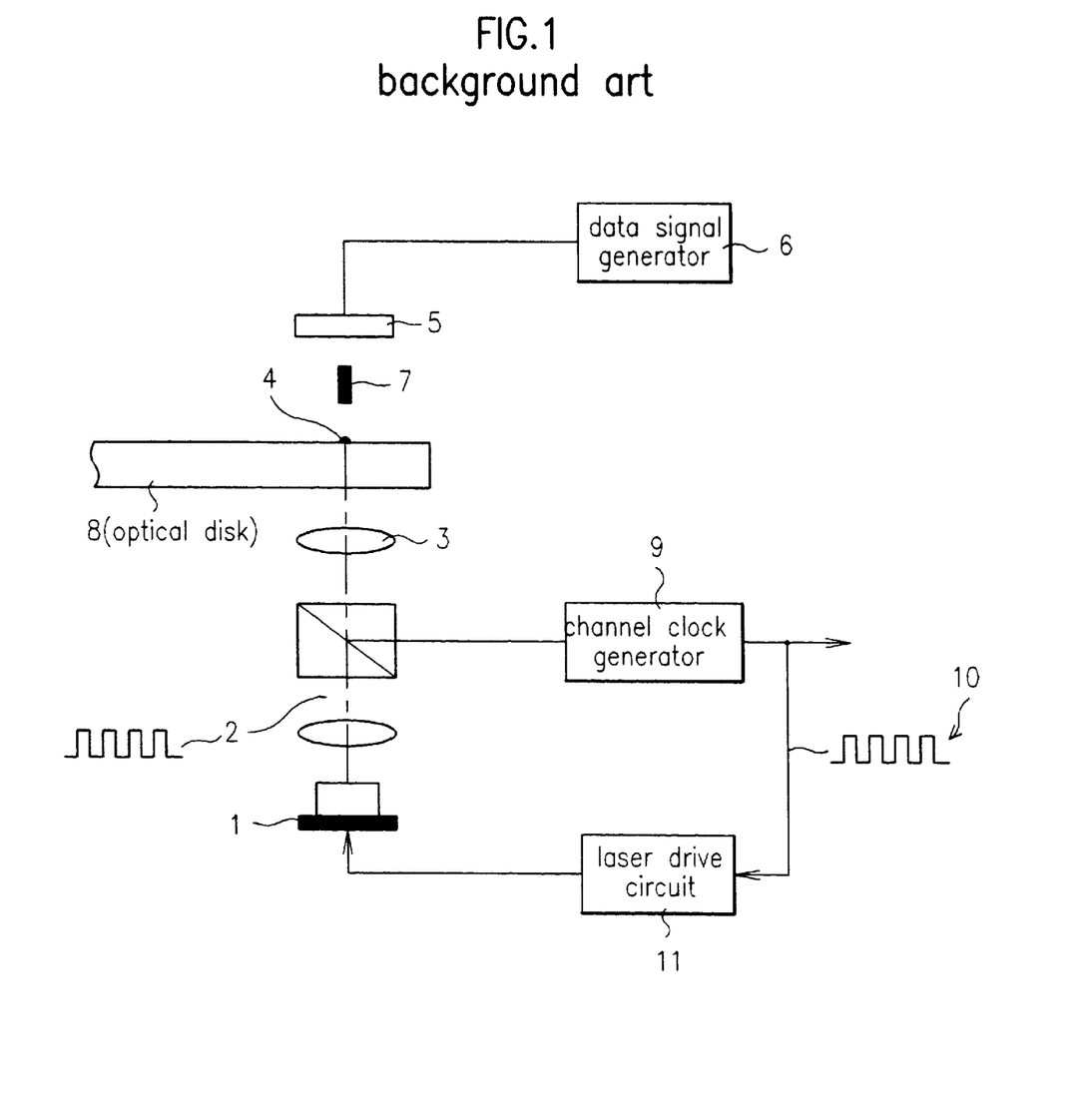
FIG. 1 is a diagram showing the conventional apparatus recording the information on the rewritable optical media.
Figure 2A:
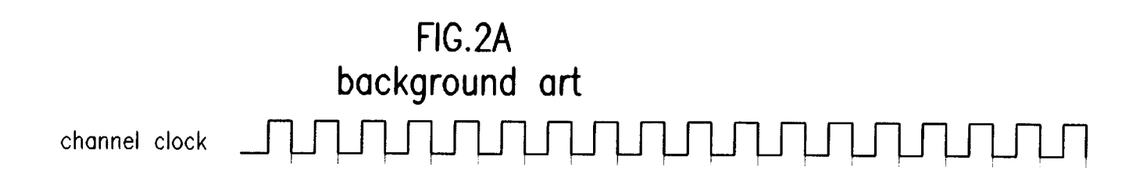
FIGS. 2(a) to 2(e) are the diagrams showing the timing signals observed at the various points in FIG. 1.
Figure 2B:
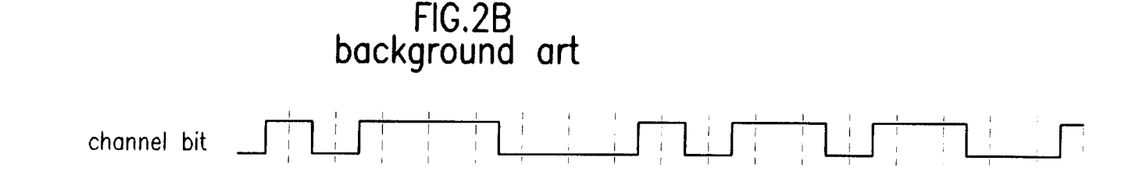
Figure 2C:
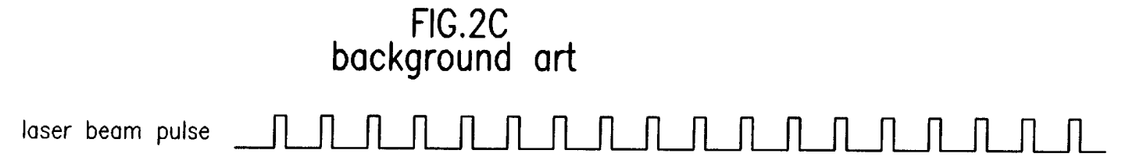
Figure 2D:
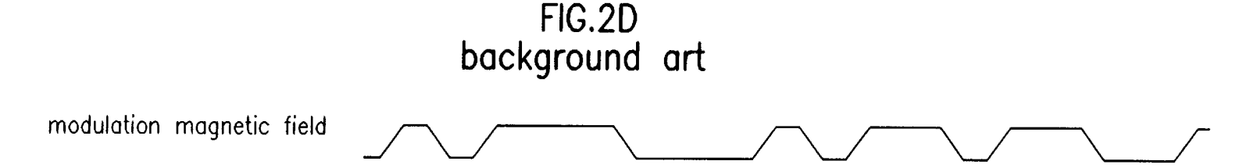
Figure 2E:
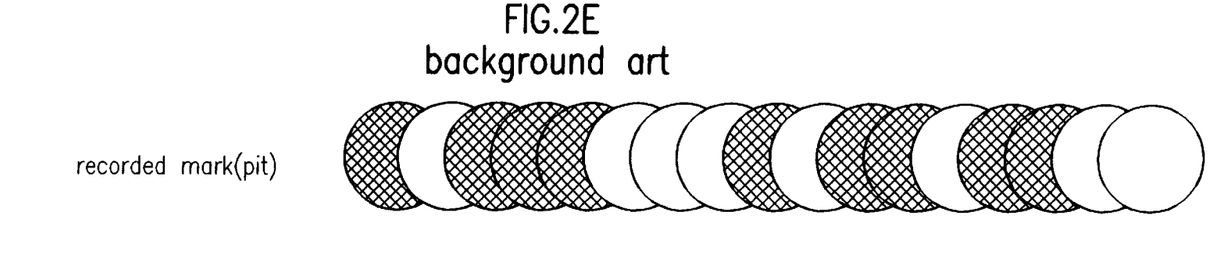

Referring to FIGS. 1 and 2, the process for recording the information on the rewritable magneto-optical media is explained. FIG. 1 is a diagram showing a conventional type of recording apparatus, and FIG. 2 is a timing diagram to explain the operation of the apparatus in FIG. 1. Based on the information initially preformatted on the optical disk, a channel clock signal generator 9 generates a channel clock signal 10 shown in FIG. 2(a). In response to the channel clock signal 10, laser driver 11 makes the laser diode 1 emit pulse beam. Laser pulse beam 2 of FIG. 2 is irradiated on the optical disk 8 as a optical spot 4 through an objective lens 3. On the other hand, a magnetic head 5 which is closely disposed to optical disk 8 and is driven by signal generator 6 forms a modulation magnetic field 7 shown in FIG. 2(d). Therefore, a mark of FIG. 2(e), corresponding to a channel bit shown in FIG. 2(b), is recorded on the optical disk 8. As shown in FIGS. 2(a)–2(e), if the frequency of channel clock signal 10 is increased and the laser beam focussed as a spot 4 is irradiated on the optical disk 8 as a pulse, by the combination of the pulse type laser beam and the modulation magnetic field, the optical spot 4 in synchronization with the channel clock signal 10 is irradiated on the optical disk 8. Marks are overlapped and then recorded on the optical disk 8 by the optical spots irradiated like this. According to this method, magnetic pit which has the mark length shorter than the optical spot 4 is recorded. This method is a known technique published in Japanese patent publication Pyungsung No 1-292603.

As a method for retrieving the recorded information from the optical disk, on the other hand, there is a method to focus laser beam with a constant output power as a spot whose diameter is as short as its wavelength and then irradiate as a spot on the surface of the rewritable magneto_optical media.

Figure 3:
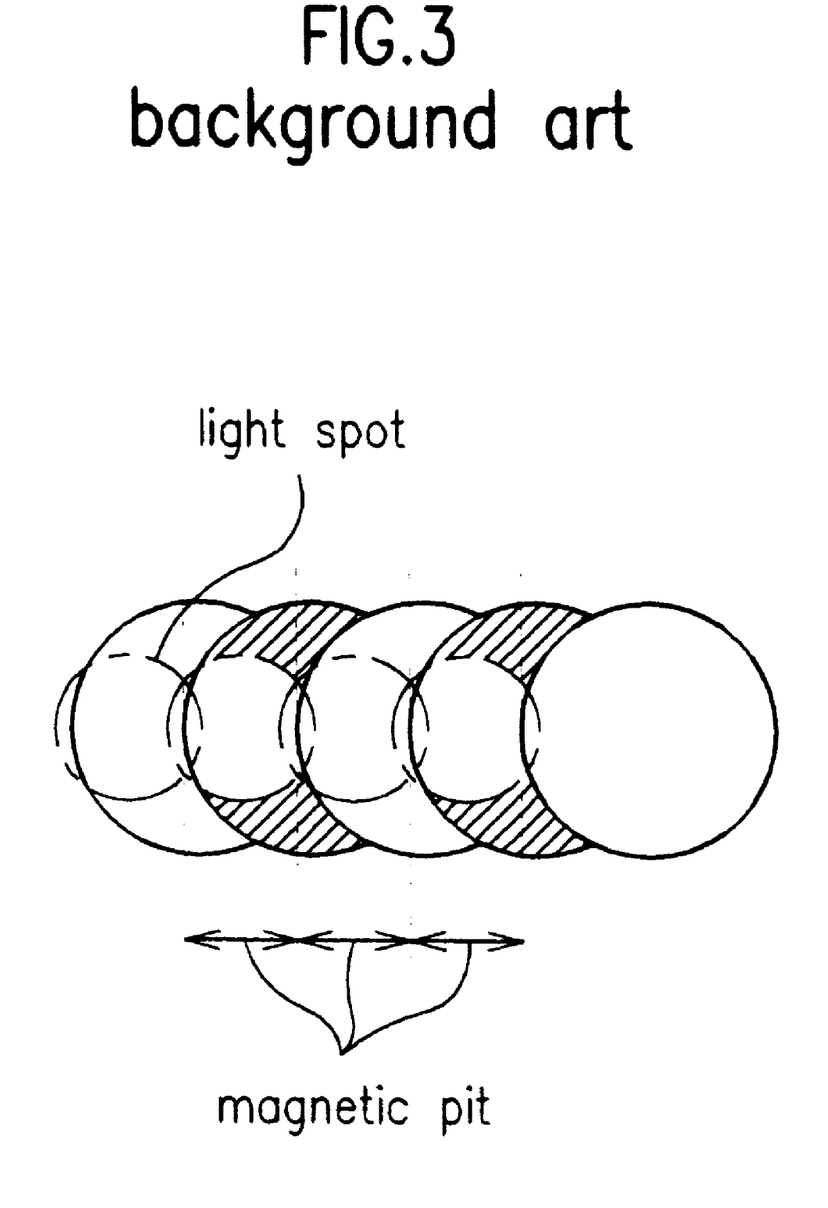
FIG. 3 is a diagram to show the problems occurring in retrieving the information recorded in high density on the rewritable optical media.

The focussed optical spot is reflected from the surface of the rewritable magneto_optical media. At this time, the polarization state of the laser beam is changed by Kerr effect. By optically detecting the change of the polarization state of the reflected beam, the information recorded on the magneto-optical media in magnetic state is read from the media. However, as shown in FIG. 3, as the information is recorded on the rewritable magneto_optical media in high density, the length of the magnetic mark is getting shorter and the optical spot is getting longer than the magnetic pit (or mark). As the result, a problem arises in the resolution capability when the mark is read out.

Figure 4:
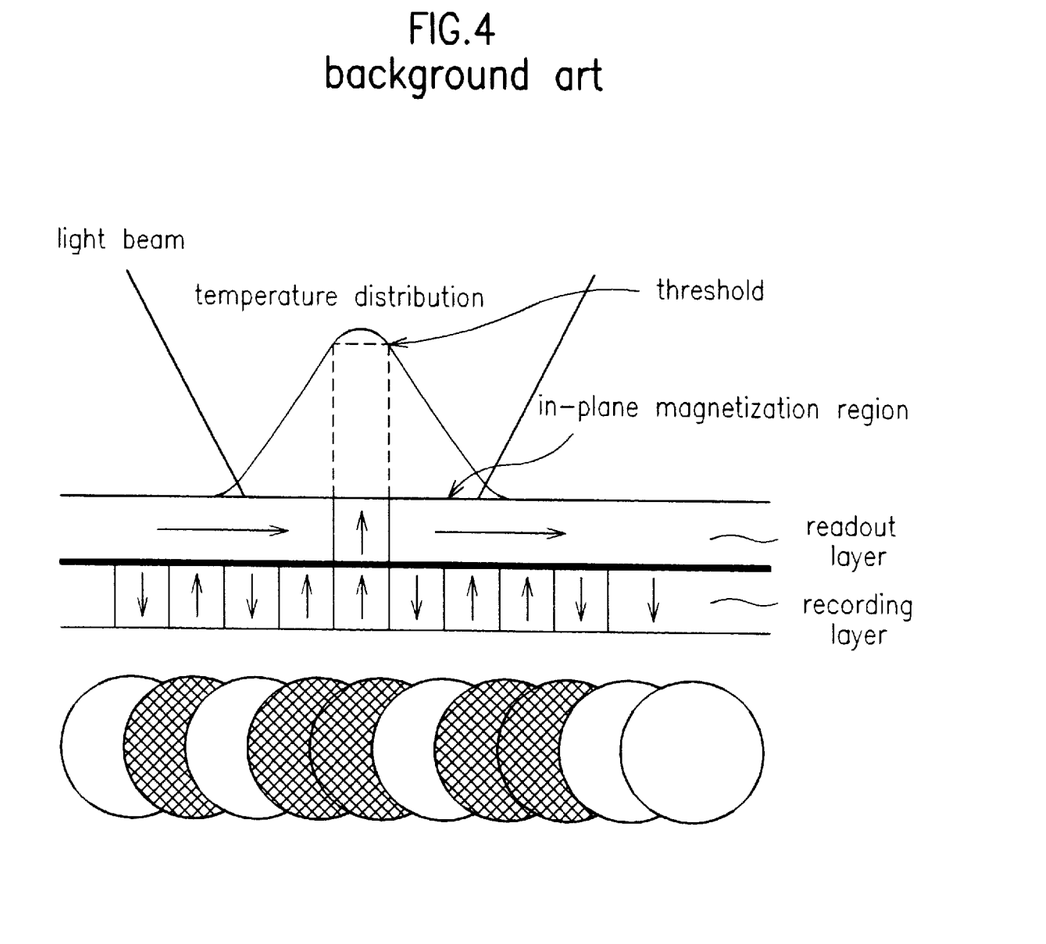
FIG. 4 is a diagram showing the MSR technique which retrieves the recorded information by using the in-plane magnetization layer.

In order to solve this problem, super resolution techniques have been attempted. As one of the techniques, a method of magnetically induced super resolution (MSR) using an exchange coupling force has been introduced. A method of using an in-plane magnetic layer which is a kind of the MSR is shown in FIG. 4. As shown in FIG. 4, the rewritable magneto_optical media consists of two layers having an exchange coupling structure between a readout layer with a relatively low coercivity and a recording layer with a relatively high coercivity. The readout layer has the in-plane magnetic layer. However, when the temperature of the layer is over a specific temperature, the readout layer changes its magnetic orientation and has a perpendicular magnetization. The recording layer is a perpendicular magnetization layer so as to preserve the information. If the laser beam is irradiated on the readout layer in order to retrieve the information, the magnetization of the readout layer of high temperature area in the middle of the optical spot (the area with the temperature above threshold value in FIG. 4) is changed from the in-plane magnetization to the perpendicular magnetization, and then a polar Kerr effect comes out. In other words, the magnetic field in the high temperature area of the readout layer is changed into the direction of the magnetic field of the recording layer. On the contrary, because the Kerr effect does not occur in the low temperature area in the neighborhood, the magnetization of the recording layer is masked. Therefore, if the power of the regeneration laser beam is properly selected, the recorded information is retrieved from the high temperature area corresponding to the middle of the laser spot, and, as the result, the retrieving operation in super resolution is possible. However, by the reason that this method of retrieving a small magnetic pit (or mark) by masking the readout layer like this uses a subtle temperature distribution in the beam spot, the change in the magnetic orientation is affected by the fluctuation of the rotation speed of the laser disk and the change in the power of the regeneration laser beam and therefore is unsatisfactory As the result, a good carrier-to-noise ratio is not obtained. As the result, the error rate becomes high and the jitter occurs, and a good quality of the readout signal is not obtained.

As a method to solve this problem, the technique irradiating a regeneration laser beam in a pulse synchronized with the channel clock signal is disclosed in Japanese patent publication Pyungsung 4-325948. According to this technique, there is a merit making the error rate very low.

Figure 5:
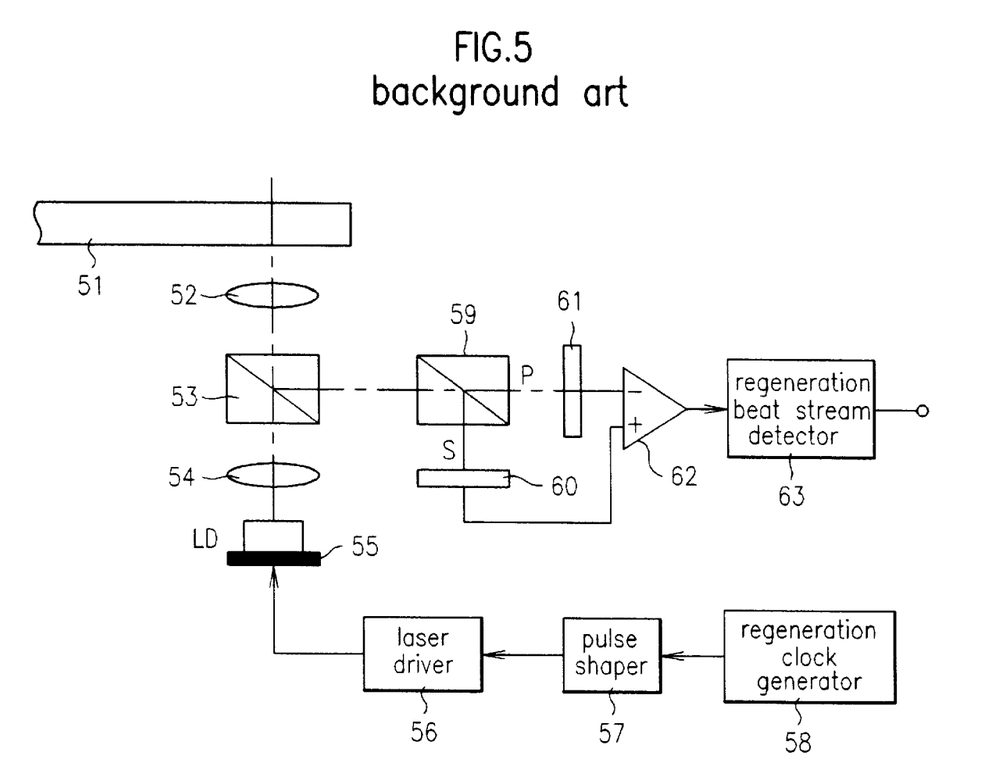
FIG. 5 is a diagram to show the conventional apparatus for retrieving the recorded information from the rewritable optical media.

FIG. 5 shows an example of the apparatus for retrieving the recorded information from the rewritable optical media. Based on the regeneration clock signal of clock generator 58, a pulse shaper 57 outputs a pulse type of signal. In response to this pulse type of signal, laser driver 56 drives the laser diode 55. The laser beam emitted in the pulse type from the laser diode 55 is focussed on the surface of the rewritable optical media 51 by collimator lens 54 and objective lens 52. The laser beam spot focussed on the media 51 is reflected from the readout layer and passed through the objective lens 52, and then comes toward the first polarized beam splitter 53. The optical spot is again applied to the second polarized beam splitter 59 by the first polarized beam splitter 53. In this splitter 59, p-polarization component of the beam spot is transmitted through the splitter 59 and s-polarization component is reflected from the splitter 59.

The p-polarization component and the s-polarization component are focussed and then converted into electrical signals by the first photo detector 61 and the second photo detector 60, respectively. The photoelectric converted electrical signals is applied to the difference amplifier 62. After the signals are amplified, they are applied to the regenerated bit stream detector 63. The regenerated bit stream detector 63 processes the output signal of the difference amplifier 62 and then generates a bit signal corresponding to the recorded information, that is, a binary signal. Usually, the regenerated bit stream detector 63 filters the output pulse signal of the difference amplifier 62 by using a lowpass filter and generates a regenerated bit signal of 0 or 1 by zero_crossing the filtered signal. However, this conventional technique has the following weakness. As described above in detail, in the regeneration method irradiating the pulse type of laser beam on the optical disk, the electrical signal detected by the photo pickup is of pulse type. However, in the high density recording media as shown in FIG. 3, the detected electrical signal is too small as compared to size of the pulsed laser spot and is therefore easily corrupted by the noise caused by the laser beam pulse. Therefore, the signal-to-noise ratio is so bad. In FIG. 5, because the s-polarization component and the p-polarization component are very small, the output pulse signal obtained from the difference amplifier 62 is also small. Moreover, the difference between the magnitude of the pulse signal corresponding to high signal 1 and the magnitude of the pulse signal corresponding to low signal 0 is too small. Therefore, it is very difficult to exactly determine 0 or 1 of the regenerated bit signal in the regenerated bit stream detector 63.

Figure 6:
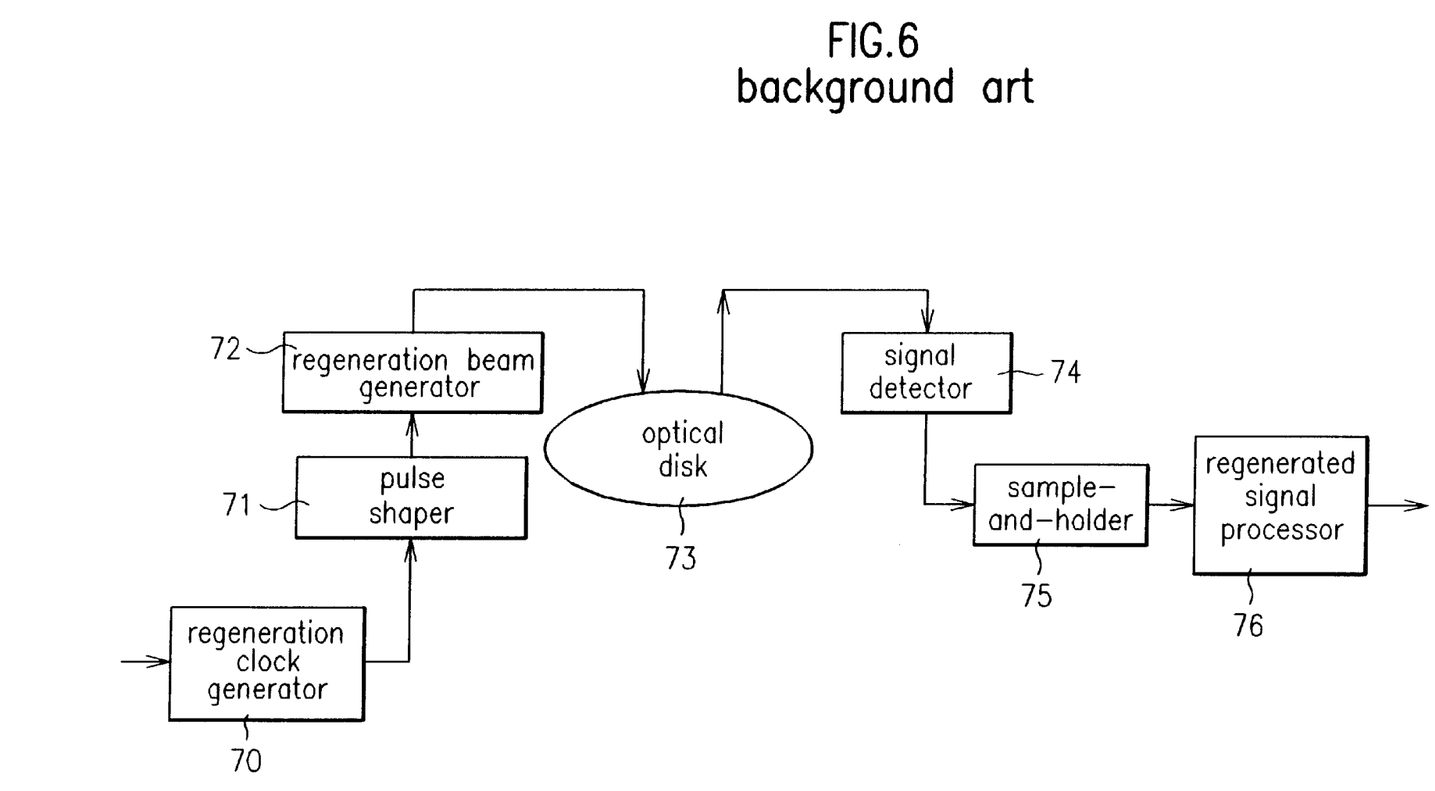
FIG. 6 is a diagram to show the conventional apparatus for retrieving the information from the rewritable optical media by using the sample-and-holder.
Figure 7A:
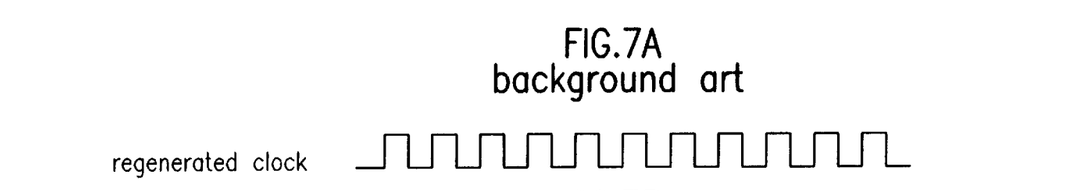
FIGS. 7(a) to 7(e) are the diagrams showing the timing signals observed at the various points in FIG. 6.
Figure 7B:
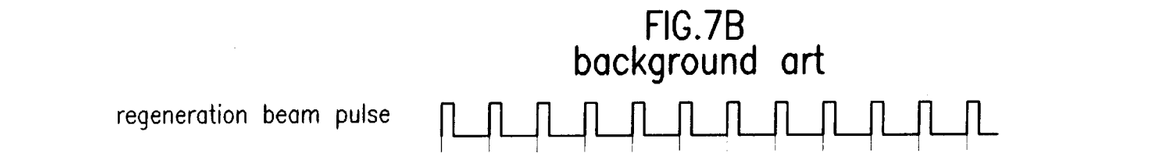
Figure 7C:
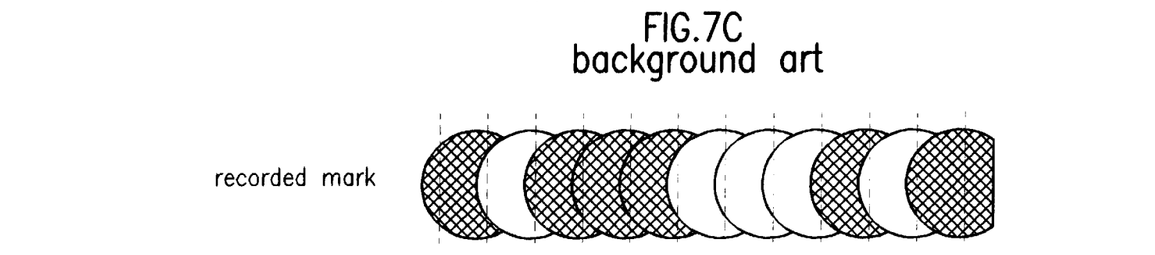
Figure 7D:
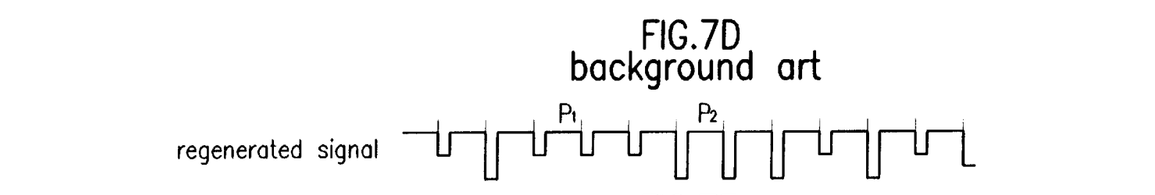
Figure 7E:
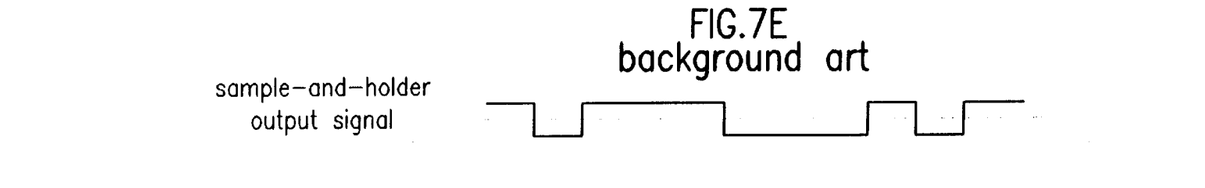

As a method to overcome this problem, the method for retrieving the regenerated bit signal without any relationship to the s-polarization and the p-polarization is disclosed in Japanese patent publication So 63-173252. According to this method, as shown in FIGS. 6 and 7, in synchronization with the regenerated clock signal generated at the regeneration clock generator 70, a pulse shaper 71 outputs a pulse signal. Based on this pulse signal, a regeneration beam generator 72 irradiates the pulse type of regeneration beam on the recorded mark of the optical disk 73. At this time, a signal detector 74 detects the electrical signal from the optical disk 73. Sample-and-holder 76 samples and holds the electrical signal in response to a sampling signal. A regenerated bit stream detector 77 obtains the regenerated bit signal from the output signal of the sample-and-holder 76. However, according to the structure in FIG. 6, the time delay from the irradiation of the regeneration beam to the detection of the electrical signal is not considered. Therefore, if the delay time occurs, the detected electrical signal is not sampled on the sampling instant and the right regenerated bit signal is not obtained.

SUMMARY OF THE INVENTION

Accordingly, the present invention is directed to a method and an apparatus for retrieving, without error, the recorded information from a rewritable optical media that substantially obviates one or more of the problems due to limitations and disadvantages of the related art.

Another object of the present invention is to provide a method and an apparatus exactly detecting the regenerated bit signal from the rewritable optical media when the pulse type of regeneration beam is irradiated on the rewritable optical media.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method and the apparatus according to the present invention includes a sample-and-holder to exactly sample and hold the regenerated electrical signal detected from rewritable optical media under consideration of the delay time occurring when the regenerated electrical signal is detected by irradiating the pulse type of the regeneration beam on the rewritable optical media.

Therefore, according to the method and the apparatus of the present invention, by irradiating a regeneration beam spot on the recorded mark of the rewritable optical media in synchronization with the clock signal, the regenerated electrical signal is retrieved from the rewritable optical media. Furthermore, the phase difference between the regenerated electrical signal and the regeneration clock signal is detected, and then the clock signal is delayed as much as the phase difference. The detected regenerated electrical signal is, in synchronization with the delayed clock signal, sampled and held.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 8A:
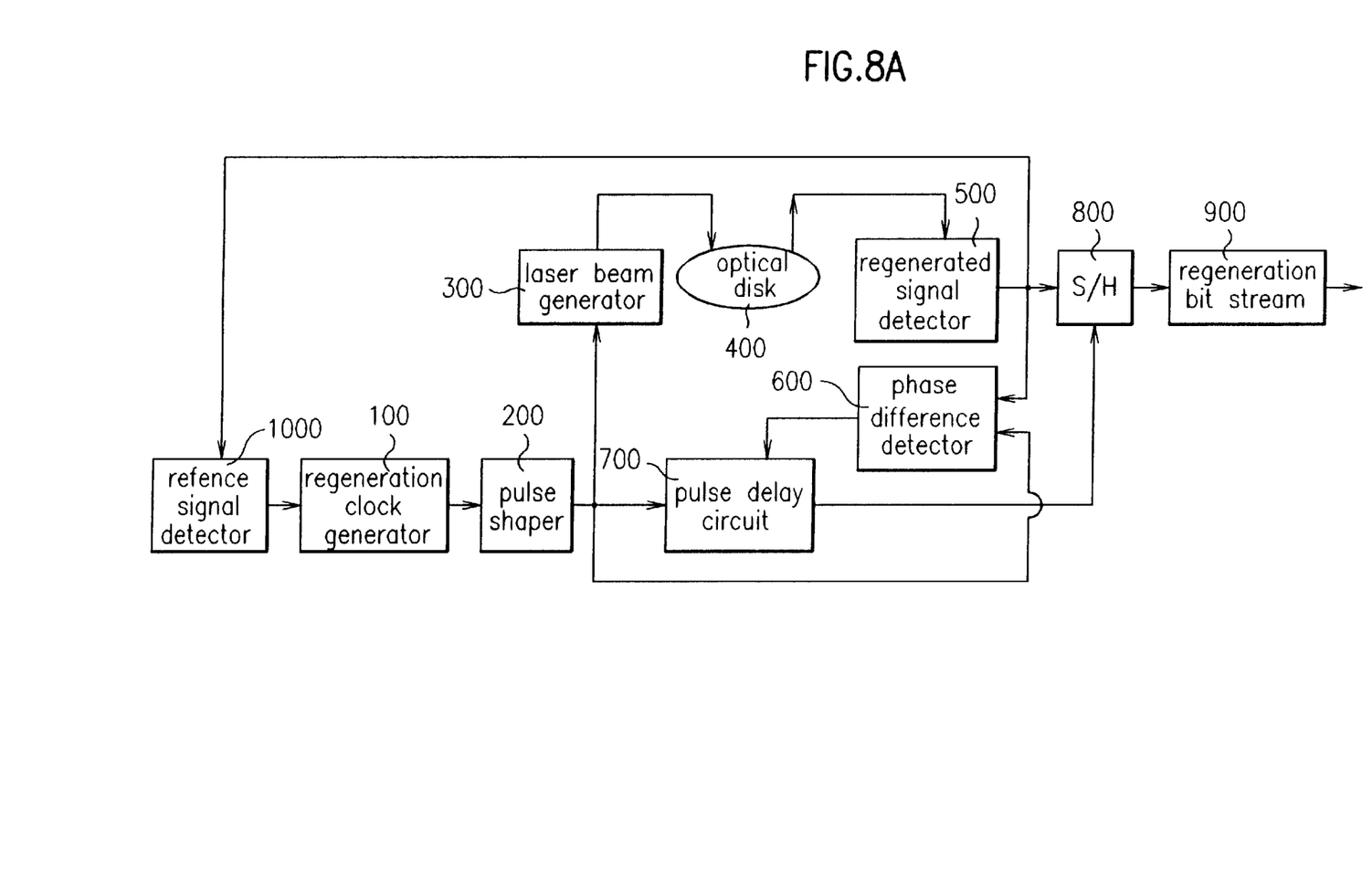
FIGS. 8(a) to 8(c) are the diagrams showing the apparatus for retrieving the recorded information from the rewritable optical media in accordance with a preferred embodiment of the present invention.
Figure 8B:
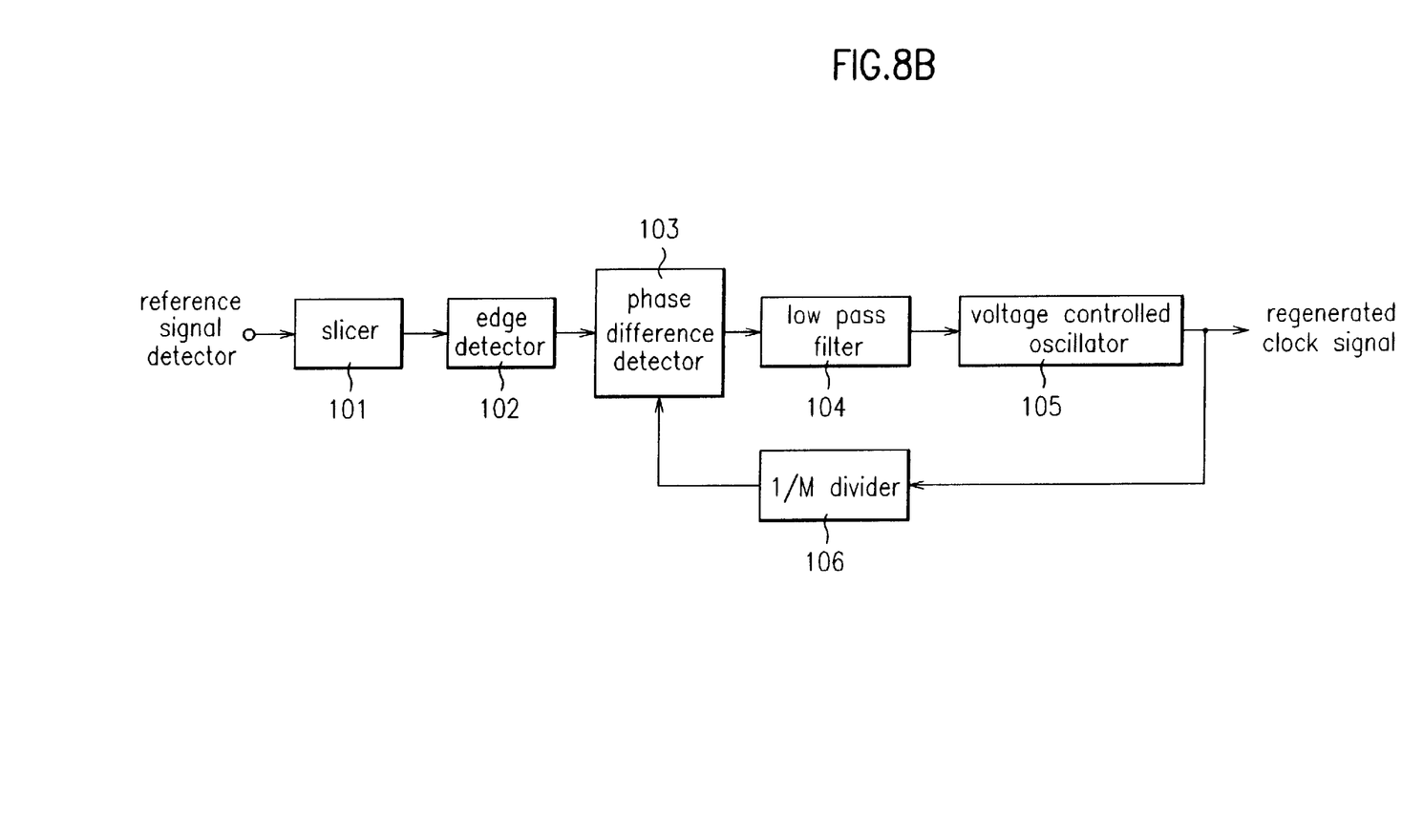
Figure 8C:
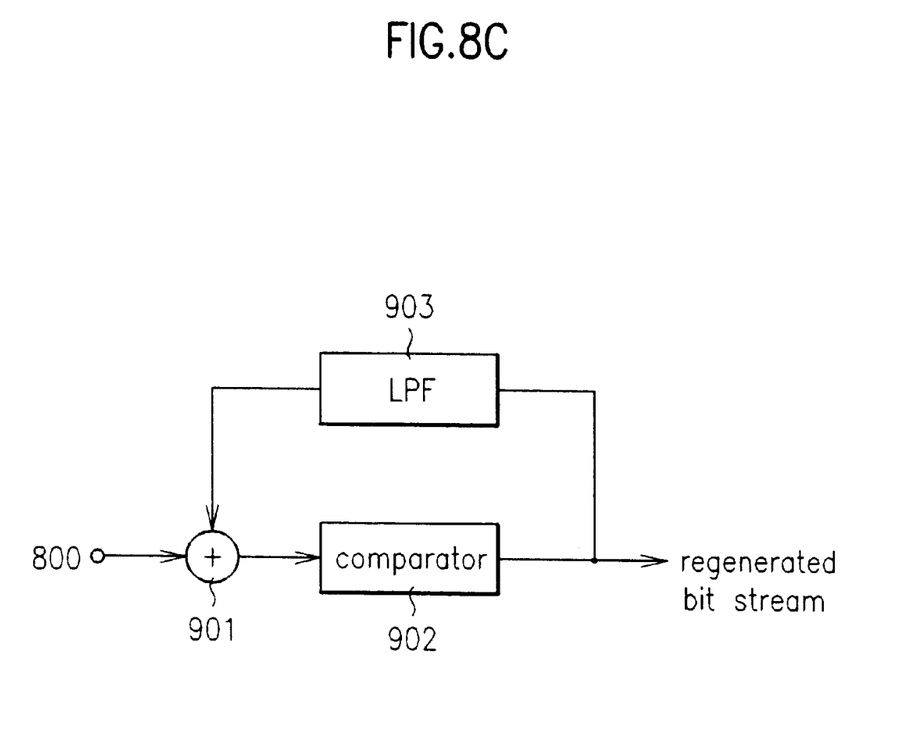

Referring to FIGS. 8 and 9, the method and the apparatus of the present invention is described in detail.

At first, the process for retrieving a regeneration electrical signal from the optical disk is the same as the conventional regeneraton device shown in FIGS. 5 and 6. The present invention is to provide the method for exactly detecting a regenerated bit signal from the detected regeneration electrical signal. In FIG. 8, if a regeneration clock pulse generator 100 generates the regeneration clock signal of FIG. 9(a), a pulse shaper 200 generates a pulse signal at the falling edge of the regeneration clock signal, in base on the regeneration clock signal, that is, in synchronization with the regeneration clock signal.

Figure 9A:
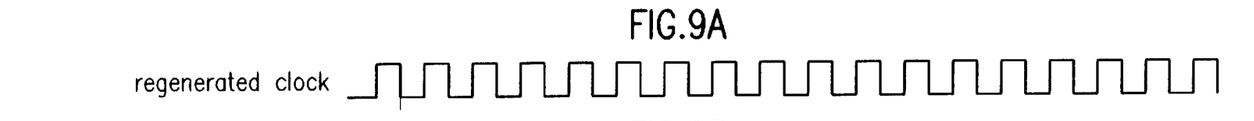
FIGS. 9(a) to 9(g) are the diagrams showing the timing signals observed at the various points in FIG. 8(a).
Figure 9B:
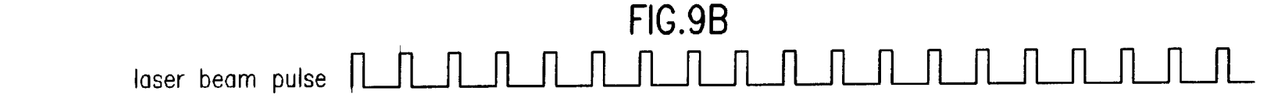
Figure 9C:
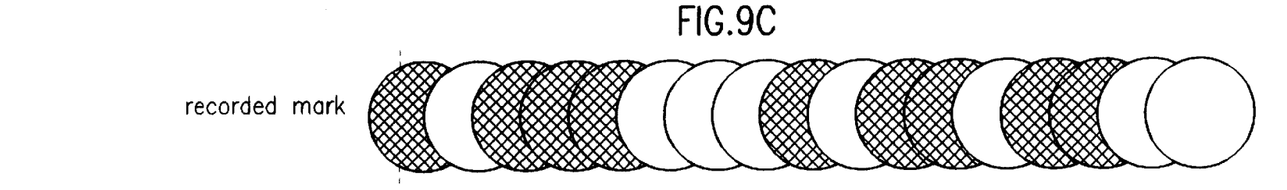
Figure 9D:
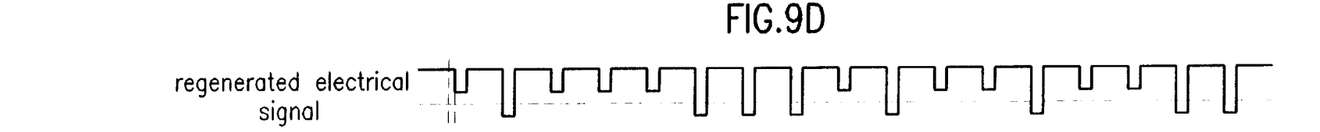
Figures 9E, 9F:
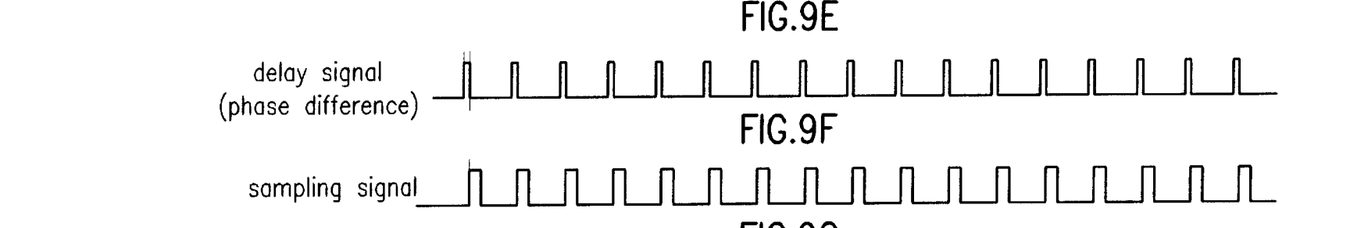
Figure 9G:
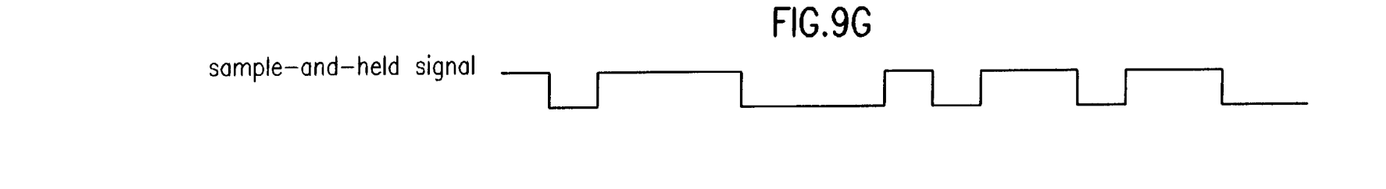

If the pulse is applied to a laser beam generator 300 from the pulse shaper 200, the laser beam generator 300 generates, based on the pulse signal, a laser beam of pulse type of FIG. 9(b) at the falling edge of the clock signal. In this apparatus, a laser diode is used in said laser beam generator 300. On the other hand, there is a lot of information recorded on the optical disk 400 as mark, as explained in FIGS. 1 and 2. The pulse type of laser beam is irradiated on a recorded mark of the optical disk 400 shown in FIG. 9©as a spot. When the irradiated beam is reflected from the recorded mark, a regeneration signal detector 500 detects the regeneration electrical signal shown in FIG. 9(d) from the recorded mark. The detailed process in which the laser beam is irradiated on the optical disk 400 and the regeneration signal detector 500 detects the regenerated electrical signal from the reflected laser beam is the same as the explanation of FIG. 5.

On the other hand, the detected regeneration electrical signal includes a reference signal to generate the clock signal of the regeneration apparatus. This reference signal indicates the synchronization signal or prepit which is included in wobbling signal. Therefore, when the regeneration electrical signal is detected, the reference signal detector 1000 detects the reference signal from the regeneration electrical signal. And, the regeneration clock generator 100 bases on the reference signal and then generates the regeneration clock signal The reference signal detection like this is done from the early stage of operation of the regeneration device. FIG. 8(b) is a detailed block diagram of the regeneration clock generator 100, which is based on the reference signal included in the regeneration electrical signal and generates the regenerated clock.

Referring to FIG. 8(b), when said reference signal is detected, a slicer 101 of the regeneration clock generator 100 slices said reference signal and outputs the sliced signal, and the edge detector 102 detects the edge of the sliced signal obtained from the slicer 101. A phase difference detector 103 detects the phase difference between the output signal of the edge detector 102 and the output signal of divider 106.

Lowpass filter 104 filters the phase difference signal obtained from the phase difference detector 103 and applies the filtered signal to voltage controlled oscillator 105. Said voltage controlled oscillator 105, based on the output signal of the lowpass filter 104, outputs an oscillation signal as the regenerated clock signal. Divider 106 divides one cycle of the oscillation signal into M equal parts and applies one of the M parts to the phase difference detector 103. In this embodiment of the present invention, a regeneration clock signal is generated in the base on the reference signal detected from optical disk 400. But this regeneration clock signal may be generated from the regeneration clock generator 100, without any relationship with the reference signal. On the other hand, the detected regeneration electrical signal is applied to the sample-and-holder 800 and the phase difference detector 600, and the pulse signal obtained from pulse shaper 200 is applied to the phase difference detector 600. The phase difference detector 600 detects the phase difference between the regeneration electrical signal and the pulse signal and generates the delay signal of FIG. 9(e) corresponding to the phase difference. When the delay signal is applied from said phase difference detector 600 to a pulse delay circuit 700, the pulse delay circuit 700 delays the pulse signal received from the pulse shaper 200 as much as the delay signal and then supplies the sample-and-holder 800 with the delayed pulse signal as a sampling signal of FIG. 9(f). When the sampling signal is applied from said pulse delay circuit to the sample-and-holder 800, the sample-and-holder 800 samples the regenerated electrical signal received from said regenerated signal detector 500 and holds the sampled signal, and then outputs the sampled signal.

When a regenerated bit stream detector 900 is fed with the output signal of said sample-and-holder 800, the regenerated bit stream detector 800 detects a regenerated bit signal from the output signal of the sample-and- holder 800. In this embodiment of the present invention, the regenerated bit stream detector 900 consists of an adder 901 which adds the output signal from sample-and-holder 800 and the output signal from the lowpass filter 903, a comparator 902 which obtains a regenerated bit signal by comparing the output signal of the adder 901 with the reference signal and a lowpass filter 903 which filters the regenerated bit signal obtained from the comparator 902 and supplies the adder 901 with the filtered signal. Therefore, said comparator 902 substantially operates as a level slicer.

According to the present invention, by sampling and holding the regenerated electrical signal and then by zero-crossing the sampled signal through a regenerated bit stream detector 900, the regenerated bit stream is obtained. Furthermore, by properly modulating the regenerated bit stream, the information recorded on the optical disk is read out. Therefore, even though the difference between the regenerated electrical signal corresponding to high level binary signal and the regenerated electrical signal corresponding to low level binary signal is very small, the regenerated bit signal is detected a little more exactly.

Furthermore, when the regenerated clock signal or the pulse signal is used as a sampling signal for the sample-and-holder, by delaying said pulse signal or the regenerated clock signal as much as the phase difference between said regenerated electrical signal and said pulse signal (or clock signal) and by using the delayed signal as said sampling signal, the regenerated bit stream is a little more exactly obtained from said regenerated electrical signal.

It will be apparent to those skilled in the art that various modifications and variations can be made in method and apparatus for retrieving the information recorded on a rewritable optical media of the present invention without departing from the spirit or scope of the invention. Thus, it is intended that the present invention covers the modifications and variations of this invention provided they come within the scope of the appended claims and their equivalents.

What is claimed is:

1. A method for retrieving the information recorded on a rewritable magneto-optical media by using a regeneration device, comprising the steps of:

irradiating a regeneration beam synchronous with a clock signal on a recorded mark on a rewritable optical media and detecting a regenerated electrical signal from said recorded mark;

detecting the phase difference between said regenerated electrical signal and the clock signal;

delaying said clock signal as much as said phase difference;

sampling and holding said regenerated electrical signal by using said delayed clock signal as a sampling signal; and obtaining a regenerated bit stream from said sampled and held electrical signal.

2. A method as claimed in claim 1, wherein said clock signal is generated based on a reference signal included in the said regenerated electrical signal.

3. A method as claimed in claim 1, wherein said clock signal is generated within a regeneration apparatus itself.

4. A method as claimed in claim 1, wherein said step of obtaining includes the steps of:

filtering the previous regenerated bit signal, which is obtained just before, by a lowpass filter;

adding the previous regenerated bit signal obtained by said filtering and the present regenerated electrical signal obtained by said sampling and holding; and, obtaining a present regenerated bit signal corresponding to the present regenerated electrical signal by passing the output signal obtained by said adding through a zero-crossing circuit.

5. A method as claimed in claim 1, wherein said regeneration beam is a laser beam.

6. A method for retrieving the information recorded on a rewritable magneto-optical media comprising the steps of:

generating a pulse signal synchronized with a regeneration clock signal;

generating a laser beam of a pulse type based on said pulse signal;

detecting a regenerated electrical signal from a recorded mark on a rewritable optical media by irradiating said pulse type laser beam on the mark recorded on the optical media;

detecting a phase difference between said pulse signal and the regenerated electrical signal obtained from said detecting the regenerated electrical signal;

delaying said pulse signal by said phase difference;

sampling and holding said detected regenerated electrical signal by using said delayed pulse signal as a sampling signal; and detecting a regenerated bit signal from the regenerated electrical signal obtained by said sampling and holding.

7. A method as claimed in claim 6, wherein said clock signal is generated based on a reference signal included in the said regenerated electrical signal.

8. A method as claimed in claim 6, wherein said clock signal is generated within a regeneration apparatus itself.

9. A method as claimed in claim 6, wherein said step of detecting a regenerated bit signal includes the steps of:

filtering the previous regenerated bit signal, which is obtained just before, by a lowpass filter;

adding the previous regenerated bit signal obtained by said filtering and the present regenerated electrical signal obtained by said sampling and holding; and, obtaining a present regenerated bit signal corresponding to the present regenerated electrical signal by zero-crossing the signal obtained by said adding.

10. An apparatus for retrieving the information recorded on a rewritable magneto-optical media comprising of:

a regeneration clock signal generator for generating a regeneration clock signal;

a pulse shaper for generating a pulse signal in synchronization with said regeneration clock signal;

a laser beam generator for generating a pulse type laser beam in synchronization with said pulse signal and for irradiating said laser beam on the mark recorded on said rewritable optical media;

a regenerated signal detector for reading out a regenerated electrical signal from said rewritable magneto_optical media when said laser beam is irradiated on said rewritable magneto_optical media;

a phase difference detector for detecting a phase difference between said pulse signal and said detected regenerated electrical signal and for generating a delayed signal corresponding to said phase difference;

a pulse delay circuit for delaying said pulse signal by said delayed signal;

a sample-and-holder for sampling and holding said detected regenerated electrical signal by using said delayed pulse signal as a sampling signal; and a regenerated bit stream detector for detecting a regenerated bit stream from the output signal of said sample and holder.

11. Apparatus as claimed in claim 10, wherein a reference signal detector which detects a reference signal from said regenerated electrical signal in order to generate said regenerated clock signal and supplies said regeneration clock signal generator is further included.

12. Apparatus as claimed in claim 11, wherein said regeneration clock signal generator includes:

a slicer for slicing said reference signal;

an edge detector for detecting an edge signal of the output signal of said slicer;

a phase difference detector for detecting a phase difference between the output signal of said edge detector and another input signal;

a lowpass filter for filtering the output of said phase difference detector;

a voltage controlled oscillator for generating an oscillation signal as said regeneration clock signal in response to the output signal of said lowpass filter; and a divider for dividing the output signal of said voltage controlled oscillator and then for applying the divided output signal to said phase difference as said another input signal.

13. Apparatus as claimed in claim 10, wherein said clock signal is generated within said regeneration apparatus itself.

14. Apparatus as claimed in claim 10, wherein said regenerated bit stream detector includes:

an adder for adding the output signal of said sample-and-holder and another input signal;

a comparator for generating a regenerated bit signal by zero-crossing the output signal of said adder; and a lowpass filter for filtering said regenerated bit signal and then for applying its output signal to said another input signal of said adder.

* * * * *